US006614905B1

(12) United States Patent
Kristensen

(10) Patent No.: US 6,614,905 B1
(45) **Date of Patent: *Sep. 2, 2003**

(54) SUPPORT STRUCTURE FOR A KEYPAD

(75) Inventor: Jakob Kristensen, Oelstykke (DK)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/505,457

(22) Filed: Feb. 11, 2000

(30) Foreign Application Priority Data

Feb. 12, 1999 (GB) ............................................ 9903258

(51) Int. Cl.[7] ................................................ H04M 1/00
(52) U.S. Cl. .................................. 379/368; 379/433.07
(58) Field of Search ....................... 379/433.06, 433.07, 379/433.01, 433.11, 368; 455/90; 264/251

(56) References Cited

U.S. PATENT DOCUMENTS 3,693,775 A 9/1972 Brooks et al. ................ 197/98
4,536,625 A 8/1985 Bebie ......................... 200/5 A
5,219,067 A 6/1993 Lima et al. .............. 200/302.2
5,311,656 A 5/1994 Eldershaw ................... 29/622
5,795,525 A * 8/1998 Naritomi .................... 264/251
5,848,152 A * 12/1998 Slipy et al. ............ 379/433.13

FOREIGN PATENT DOCUMENTS

| | | |
|---|---|---|
| AU | 6754581 | 9/1982 |
| DE | 3811737 | 10/1989 |
| EP | 0845795 | 6/1998 |
| GB | 908327 | 10/1962 |
| GB | 1352076 | 5/1974 |

* cited by examiner

*Primary Examiner*—Jack Chiang
(74) *Attorney, Agent, or Firm*—Perman & Green, LLP

(57) ABSTRACT

A handset having a keypad structure for inputting information is described. The keypad structure includes a keypad assembly having a plurality of keys being interconnected by a foil, the plurality of keys being provided with activation pins, a keypad base part having a switching device that is activated by an associated activation pin when a respective key is depressed, and a support device arranged in between the keypad assembly and the keypad base part supporting the foil of the keypad in between the keys.

7 Claims, 5 Drawing Sheets

SUPPORT STRUCTURE FOR A KEYPAD

TECHNICAL FIELD OF THE INVENTION

The invention relates to a keypad structure for a communication terminal. In particular the keypad assembly has a plurality of keys being interconnected by a foil. The keys have activation pins cooperating with switching means whereby the switching means are closed when the respective key is depressed.

BACKGROUND OF THE INVENTION

This kind of keypads is very attractive because the manufacturing costs are low. However this kind of keypad has a drawback because the foil is very flexible but not extensible. Therefore the depression of one key will cause a movement of the neighbouring keys due to the stiffness of the foil when the key is pressed. Therefore the keypads will have a cheap appearance.

SUMMARY OF THE INVENTION

An object of the invention is to provide a support structure for a keypad. The structure shall allow use of a plastic film keypad with in-moulded keys without affecting the overall quality appearance.

This purpose is obtained by a keypad structure for a communication terminal comprising a keypad assembly having a plurality of keys being interconnected by a foil, said plurality of keys are provided with activation pins, a keypad base part having switching means being activated by an associated activation pin when a respective key is depressed, and support means arranged in between the keypad assembly and the keypad base part supporting the foil of the keypad in between the keys. Hereby the depression of one key will cause a sideways movement of the neighboring key due to the force applied to the foil when the key is pressed. The keys will extend through openings in the front cover and will therefore not move due to the sideways draw. Instead the draw in the foil will be absorbed by elastic deformation of the foil surrounding the intermoulded keys.

The invention furthermore relates to a handset having such a keypad. The cost of the keypad may therefore by reduced substantially without negatively affecting the feel and appearance.

According to the preferred embodiment keypad is used in a cellular phone having exchangeable covers. The keypad assembly is maintained in a sandwich structure in between the releasable front cover and an inner housing cover. The user will be allowed to handle the keypad when he changes the front cover and the foil cover is very robust and therefor very attractive in this situation.

Preferably the support means are formed as pins and support areas on the inner housing, and said pins and support areas are raised relatively to the surrounding part of the inner housing cover. The switching means may advantageously be provided as switches on a printed circuit on a Printed Circuit Board covered by a resilient metallic dome means, whereby the switches are closed when the metallic dome means are depressed by means of the depression of the associated key.

BRIEF DESCRIPTION OF THE INVENTION

For a better understanding of the present invention and to understand how the same may be brought into effect reference will now be made, by way of example only, to accompanying drawings, in which:

FIG. 1 illustrates a preferred embodiment of a hand portable phone according to the invention.

FIG. 2 schematically shows the essential parts of a telephone for communication with a cellular or cordless network.

DETAILED DESCRIPTION OF THE INVENTION

Figure 1:
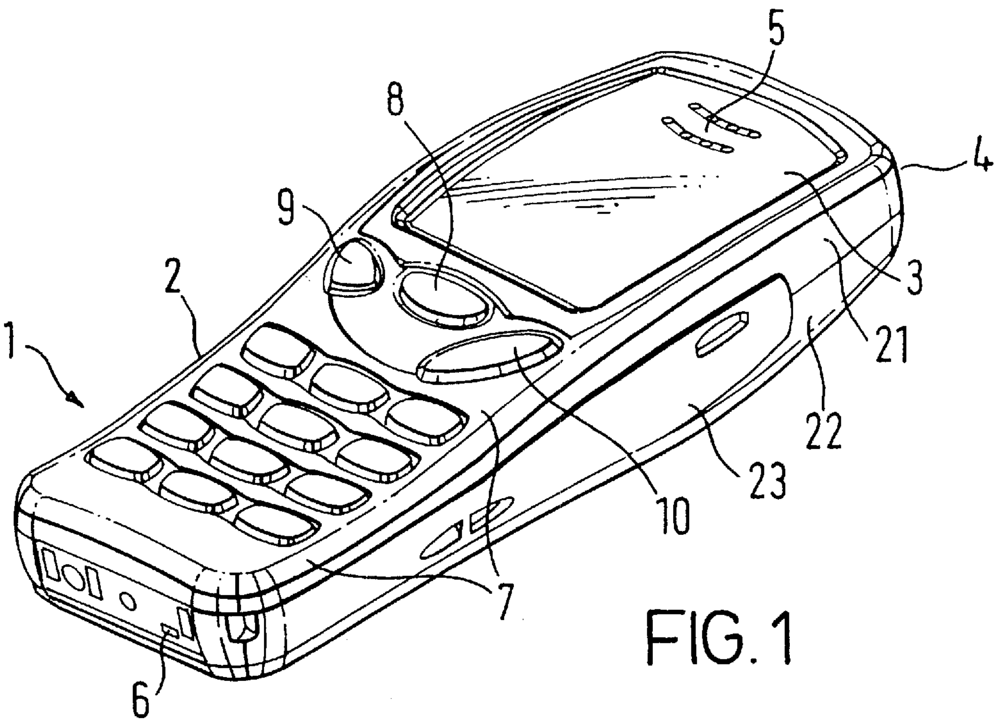
Figure 3:
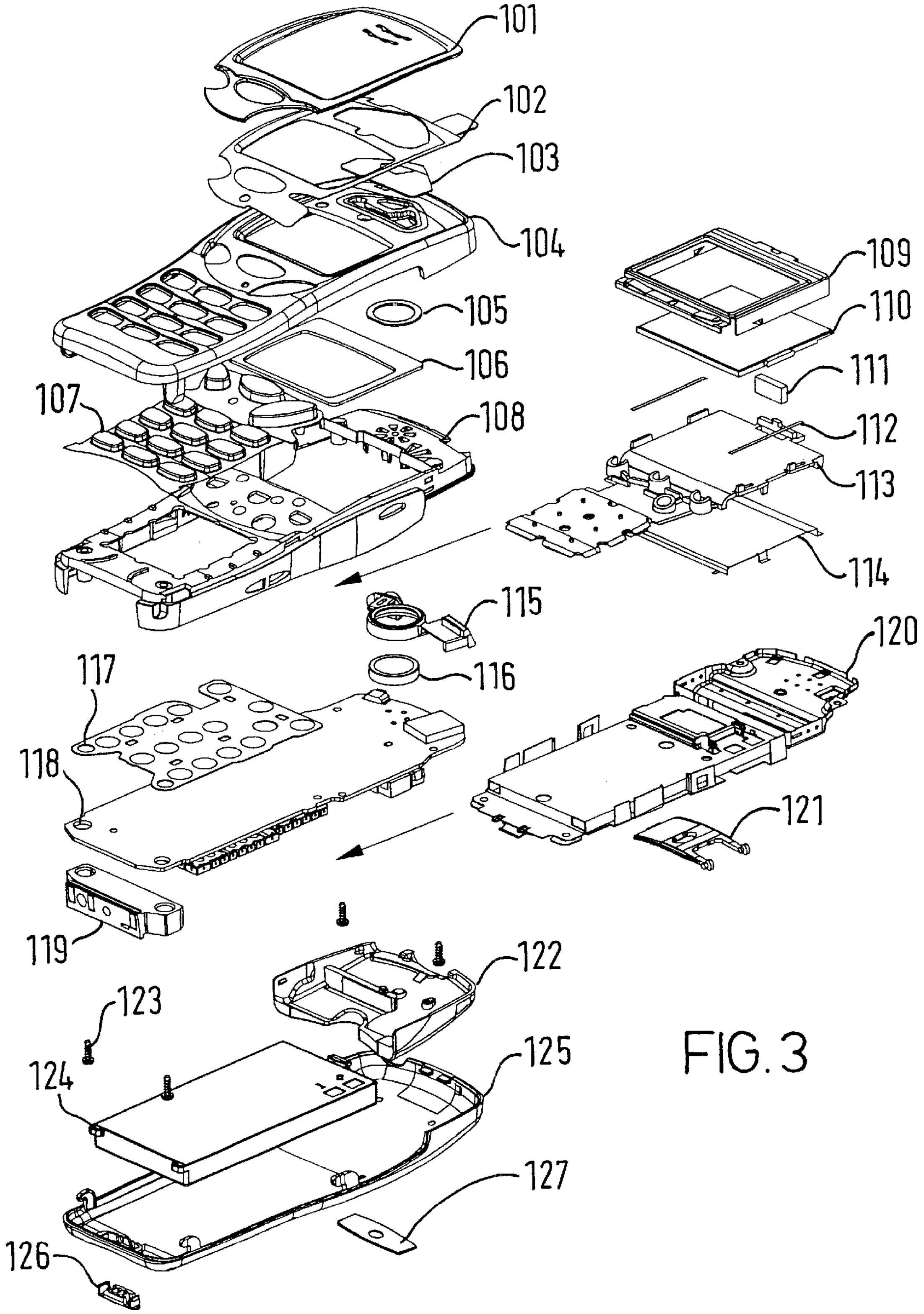
FIG. 3 shows in exploded view the individual parts of the phone shown in FIG. 1.

FIG. 1 shows a preferred embodiment of a phone according to the invention, and it will be seen that the phone, which is generally designated by 1, comprises a user interface having a keypad 2, a display 3, an on/off button 4 FIG. 3), a speaker 5 (only openings are shown in FIG. 1), and a microphone 6 (only openings are shown in FIG. 1). The phone 1 according to the preferred embodiment is adapted for communication via a cellular network, but could have been designed for a cordless network as well.

According to the preferred embodiment the keypad 2 has a first group 7 of keys as alphanumeric keys, a soft key 8, and a navigation key 10. Furthermore the keypad includes a “clear” key 9. The present functionality of the soft key 8 is shown in separate fields in the display 3 just above the key 8. This key layout is characteristic of the Nokia 311™ phone and the Nokia 511™ phone.

The phone 1 has an inner housing of which gripping areas 23 are visible. An exchangeable front cover 21 and rear cover 22 are snapped onto the inner housing.

Figure 2:
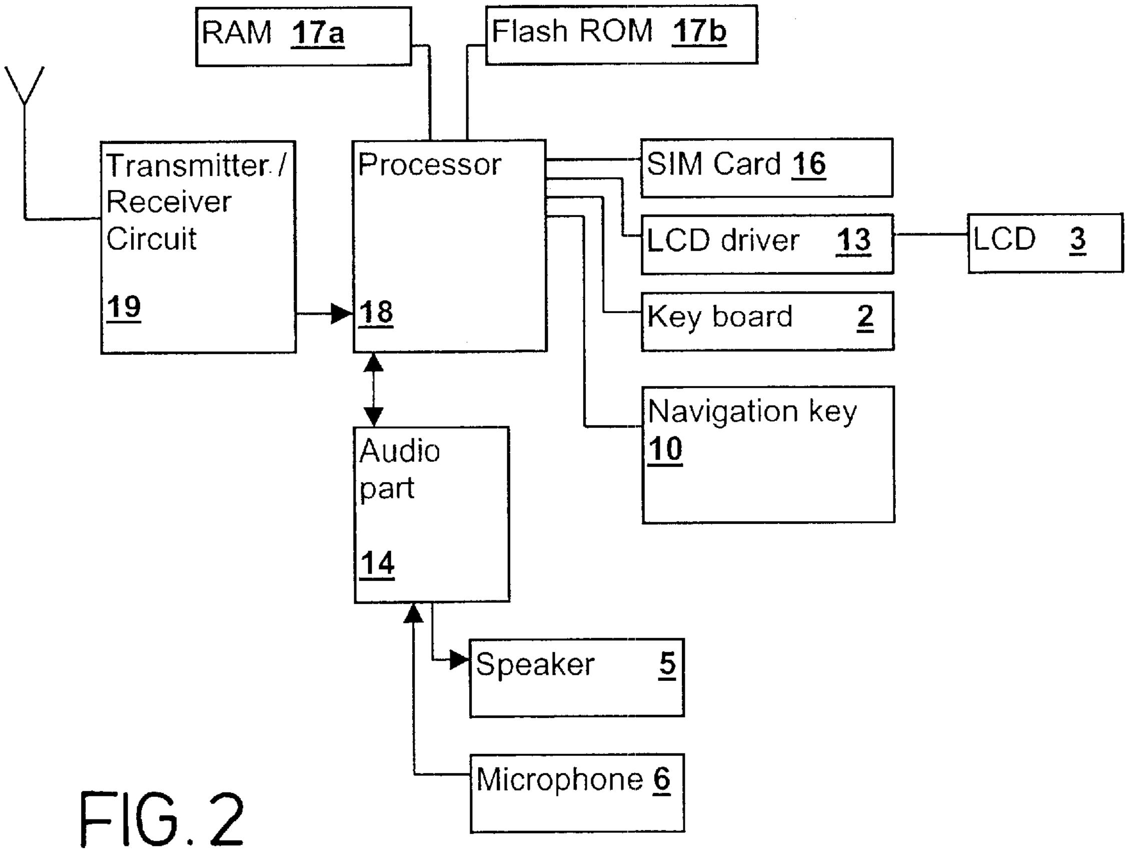

FIG. 2 schematically shows the most important parts of a preferred embodiment of the phone, said parts being essential to the understanding of the invention. The preferred embodiment of the phone of the invention is adapted for use in connection with the GSM 900 MHz and GSM 1800 MHz network, but, of course, the invention may also be applied in connection with other phone networks. The processor 18 controls the communication with the network via the transmitter/receiver circuit 19 and an antenna 20 that will be discussed in details below.

The microphone 6 transforms the user’s speech into analog signals formed thereby are A/D converted in an A/D converter (not shown) before the speech is encoded in an audio part 14. The encoded speech signal is transferred to the processor 18, which i.a. supports the GSM terminal software. The processor 18 also forms the interface to the peripheral units of the apparatus, including a RAM memory 17*a* and a Flash ROM memory 17*b*, a SIM card 16, the display 3 and the keypad 2 (as well as data, power supply, etc.). The audio part 14 speech-decodes the signal, which is transferred from the processor 18 to the earpiece 5 via a D/A converter (not shown).

The Preferred Mechanical Concept

The individual parts of the phone are shown in exploded view FIG. 3. A bezel assembly 101 is adhered to the front cover shell 104 by means of a double-sided adhesive tape 102. A speaker net 103 is sandwiched in between the bezel assembly 101 and the front cover shell 104. A speaker gasket 105 and a dust seal 106 for the display are glued to the inner surface of the front cover shell 104. This assembly is named as the front cover 21 in FIG. 1.

A keymat assembly 107 constitutes the keypad 2 in FIG. 1.

A release button 126 is snapped into a rear cover shell 125 and a logo label is glued onto the rear side of the rear cover shell 125. This assembly is named as the rear cover 22 in FIG. 1.

The phone 1 has a replaceable battery pack 124 that can be replaced when the rear cover 22 is removed from the phone.

The display assembly will be described in the following. The rear side of a light guide 113 is coated with a reflector 114 and an LCD module 110 is adhered to the front side of the light guide 113 by means of two LCD adhesive strips 112. A display frame 109 is mounted on the front side of the LCD module 110 and a zebra strip (connector) 111 connects the complete display assembly 128 (FIG. 5) to a Printed Circuit Board 118 of the Phone 1.

A multi gasket 115 for carrying a speaker unit 116 and a not shown buzzer is mounted in a front cover 108 of an inner housing. Then the display assembly is placed in the front cover 108. A dome sheet 117 is inserted in between the Printed Circuit Board 118 carrying the electrical components of the phone and the rear side of the light guide 113. Finally a bottom connector 119 is positioned and a metallic rear cover 120 of the inner housing by means of four screws 123 closes the front cover shell 108 of the inner housing. A SIM gate 121 is mounted on the rear cover 120 prior to the final assembly. An internal antenna 122 is snapped onto the assembled inner housing.

The essential purpose of the dome sheet 117 is to transform the movement of the key 7–10 into an elastically switching connection on the Printed Circuit Board 118. Furthermore the dome sheet 117 gives a tactile feeling when the keys 7–10 is pressed. In addition to this the dome sheet 117 acts as reflector for the light guide in order to provide back light for the keys 7–10. According to the preferred embodiment the dome sheet is provide as a 0.055 mm thick white polyester film adhered to a 0.085 mm thick wax coated paper sheet (for insulation). The domes have a diameter of 5.5 mm and are made of stainless steel and have a center pin underneath for better contact to the switching circuit on the Printed Circuit Board 118. When a key is pressed the center pin closes a contact by short-circuiting two terminals. This is state of the art and no further description is needed for a man skilled in the art in order to understand the inventive concept.

Figure 4:
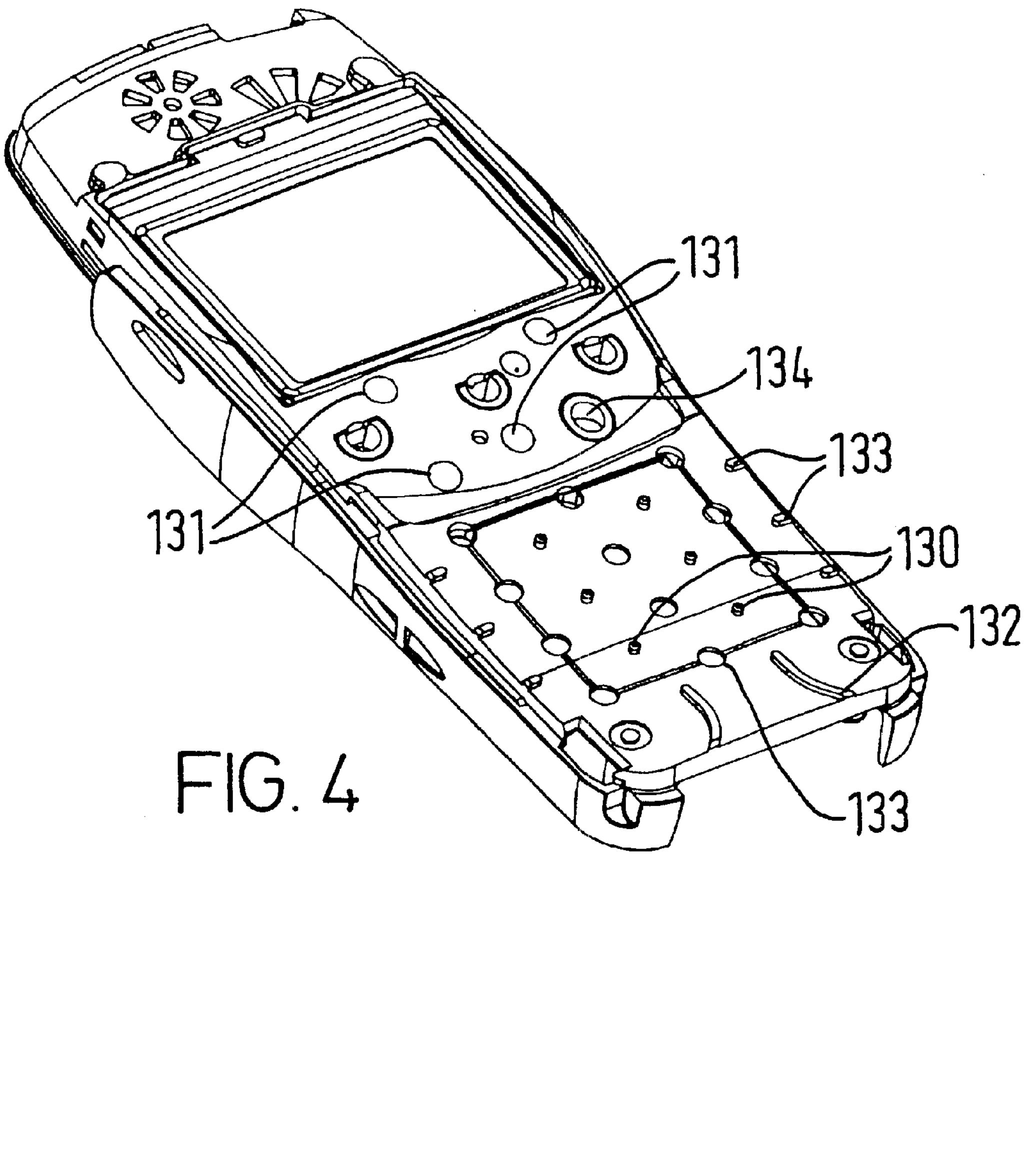
FIGS. 4 and 5 shows how the light guide and the front cover shell are assembled in the phone shown in FIG. 1.
Figure 5:
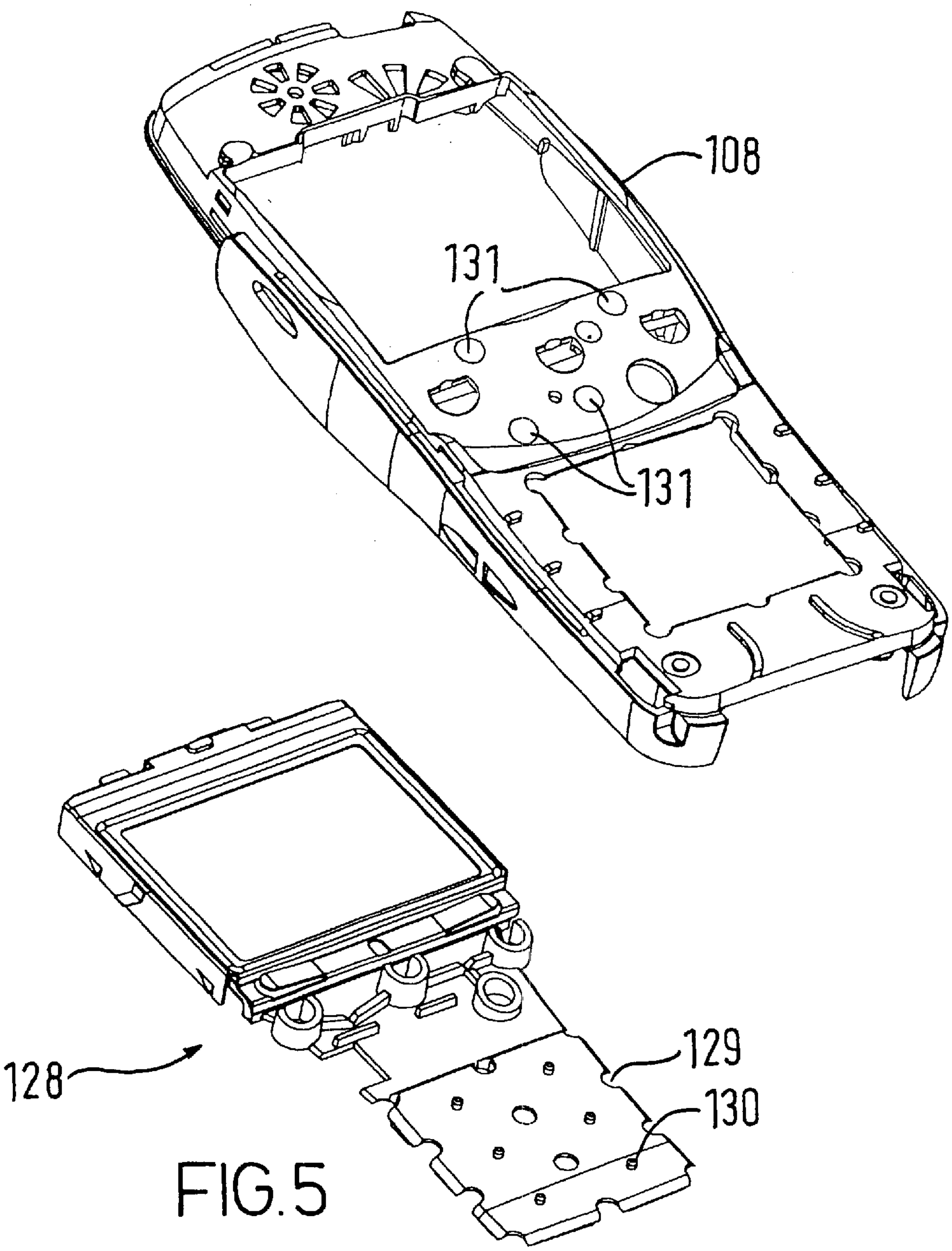

In FIGS. 4 and 5 it is shown how the light guide 113 and the front cover shell 108 are assembled in order to support the keymat assembly 107. It is seen that the light guide 113 and the front cover shell 108 has a plurality of holes 133 and 134 through which activation pins from the keypad assembly extends for cooperation with the domes of the dome sheet 117. The light guide 113 has a cover part 129 constituting a part of the front surface of the inner housing when assembled. This cover part 129 carries some pins 130 supporting the keymat assembly 107 when a key is pressed. The front surface of the front cover shell 104 has some semi-spherical raised portions 131 to support the keymat assembly 107 between the keys 8–10, and some rails 132 supporting the periphery of the keymat assembly 107. The height and the diameter of the pins 130 is approximately 0.9 mm. The distance between two pins 130 through the center of a key is approximately 19 mm.

Figure 6:
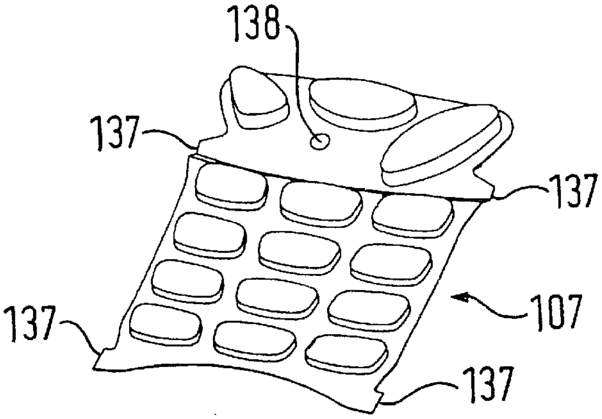
FIG. 6 shows in perspective the keymat assembly of the phone shown in FIG. 1.
Figure 7:
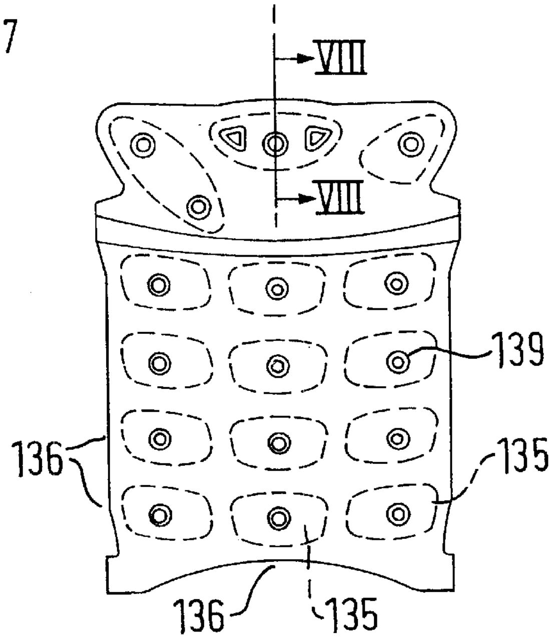
FIG. 7 shows a rear view of the keymat assembly shown in FIG. 6.
Figure 8:
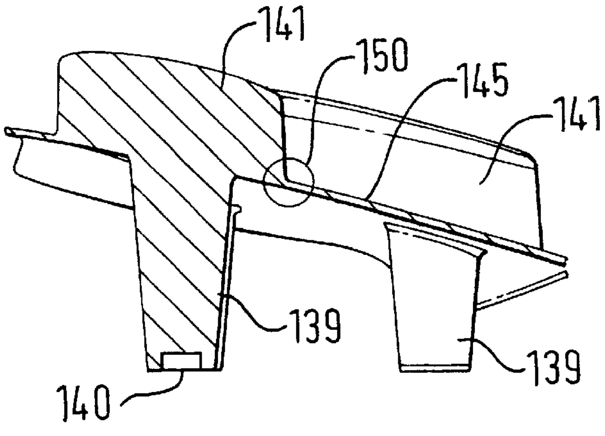
FIG. 8 shows a cross section of the keymat assembly along the line VIII—VIII in FIG. 7.

The keymat assembly 107 is shown in detail in FIG. 6 and 7. The keymat assembly 107 has four flaps 137 for being snapped into a recess in the front cover 21. Furthermore the keymat assembly 107 has a hole 138 for receiving a guiding pin (not shown) extending from the front cover 21. In FIG. 8 in-moulded bodies 135 are marked by dotted lines. When the foil and the in-mould bodies are produced by the same material the two parts of the keymat will be well integrated and the dotted lines mark only the change in the thickness of the material. Pins 139 expand from the in-mould bodies 135.

Figure 9:
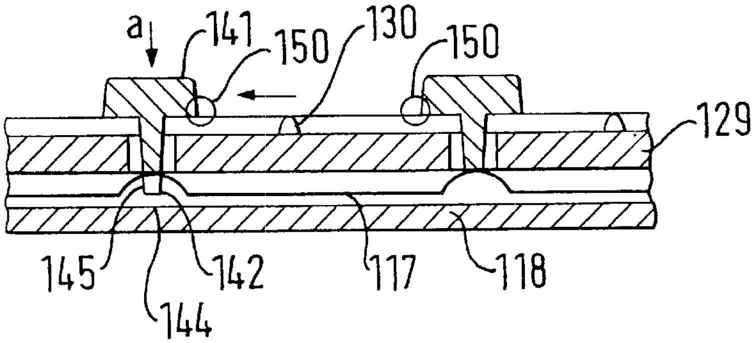
FIG. 9 shows schematically a cross section view of the keymat structure according to a preferred embodiment of the invention.

FIG. 8 shows a cross section along the line VIII—VIII in FIG. 7. Two keys 141 are visible and the foil 145 connecting the two keys 145 is clearly illustrated. Furthermore it is seen how pins 139 extend from the main body of the key 145. The pin 139 has a bore 140 in order to establish a ring shaped contact with the domes 142 of the dome sheet 117 as seen in FIG. 9. The domes 142 have contact pins 143 facing towards the metallic pads (illustrated with the referral number 144) on the Printed Circuit Board 118.

When one key 141 is pressed the support pin 130 transfers the force (FIG. 9; arrow a) in the pressing direction into a lateral force (FIG. 9; arrow b), and the key holes in the front cover 104 transfers this lateral force into an elastically deformation of the key parts 150 shown in FIGS. 8 and 9.

The support means may have any appropriate form according to the invention. However the support means have to support the keymat foil in a distance from the keys corresponding to preferably 2–3 times the the thickness of the keymat foil. Preferably the in-mould resin material is a PC (Poly Carbonate) blend. The foil or film is a 0.125 mm PC sheet with matt texture (e.g. Baybol from Bayer).

What is claimed is:

1. A keypad structure for a communication terminal formed of two different thermoplastic parts comprising:

- a keypad assembly having a plurality of keys being interconnected by a foil, the keypad assembly being provided as a polycarbonate sheet having key cavities filled with a polycarbonate for providing the keys with key bodies and activation pins;
- a keypad base part having switching means being activated by an associated activation pin when a respective key is depressed; and
- support means provided as pins, and arranged in between the keypad assembly and the keypad base part for supporting the foil of the keypad in between the keys.

2. Handset having a keypad structure for inputting information, the keyboard structure formed of two different thermoplastic parts and comprising:

- a keypad assembly being provided as a thermoplastic sheet having key cavities filled with a resin for providing the keys with key bodies and activation pins 139;
- a keypad base part having switching means being activated by an activation pin 139 when a respective key is depressed; and
- support means provided as support pins 130, and arranged in between the keypad assembly and the keypad base part for supporting the foil of the keypad in between the keys.

3. A handset according to claim 2, wherein said keys of said keypad assembly extend through openings in a front cover of said handset.

4. A handset according to claim 3, wherein said front cover is releasable and said keypad assembly is maintained in a sandwich structure in between said releasable front cover and an inner housing cover.

5. A handset according to claim 4, wherein said activation pins of said keys of said keypad assembly extend through respective holes in said inner housing cover.

6. A handset according to claim 4, wherein said support means are formed as pins and support areas on said inner housing cover said pins and support areas being raised relative to a surrounding part of said inner housing cover.

7. A handset according to claim 4, wherein said switching means are switches provided as a printed circuit on a Printed Circuit Board covered by a resilient metallic dome means, whereby the switches are closed when the metallic dome means are depressed by means of the depression of the associated key.

* * * * *